(12) United States Patent
Doherty et al.

(10) Patent No.: US 9,189,196 B2
(45) Date of Patent: Nov. 17, 2015

(54) COMPARTMENTALIZED SELF REGISTRATION OF EXTERNAL DEVICES

(71) Applicants: Ryan P. Doherty, Mountain View, CA (US); Nicholas M. Johnston, Mountain View, CA (US)

(72) Inventors: Ryan P. Doherty, Mountain View, CA (US); Nicholas M. Johnston, Mountain View, CA (US)

(73) Assignee: Google Inc., Mountain View, CA (US)

( * ) Notice: Subject to any disclaimer, the term of this patent is extended or adjusted under 35 U.S.C. 154(b) by 292 days.

(21) Appl. No.: 13/803,497

(22) Filed: Mar. 14, 2013

(65) Prior Publication Data

US 2015/0170664 A1    Jun. 18, 2015

(51) Int. Cl.
*G10L 15/22* (2006.01)
*G06F 3/16* (2006.01)
*G08C 17/00* (2006.01)
*H04Q 9/00* (2006.01)

(52) U.S. Cl.
CPC ............... *G06F 3/167* (2013.01); *G08C 17/00* (2013.01); *G10L 15/22* (2013.01); *H04Q 9/00* (2013.01); *G10L 2015/223* (2013.01)

(58) Field of Classification Search
CPC .... H04L 12/2816; G10L 15/22; G10L 15/265
USPC ........................................................ 704/275
See application file for complete search history.

(56) References Cited

U.S. PATENT DOCUMENTS

| | | | |
|---|---|---|---|
| 5,086,385 A * | 2/1992 | Launey et al. | 700/83 |
| 6,192,282 B1 * | 2/2001 | Smith et al. | 700/19 |
| 6,327,628 B1 * | 12/2001 | Anuff et al. | 719/311 |
| 7,526,539 B1 * | 4/2009 | Hsu | 709/223 |
| 2002/0007229 A1 * | 1/2002 | Hudson et al. | 700/245 |
| 2003/0009537 A1 * | 1/2003 | Wang | 709/219 |

* cited by examiner

*Primary Examiner* — Michael N Opsasnick
(74) *Attorney, Agent, or Firm* — Harrity & Harrity, LLP

(57) ABSTRACT

A device may receive, from a peripheral device, information for controlling the peripheral device. The information for controlling the peripheral device may include information identifying a voice command associated with the peripheral device and information identifying a function corresponding to the voice command. The device may receive, from a user, the voice command. The device may cause the peripheral device to perform the function based on receiving the voice command.

20 Claims, 12 Drawing Sheets

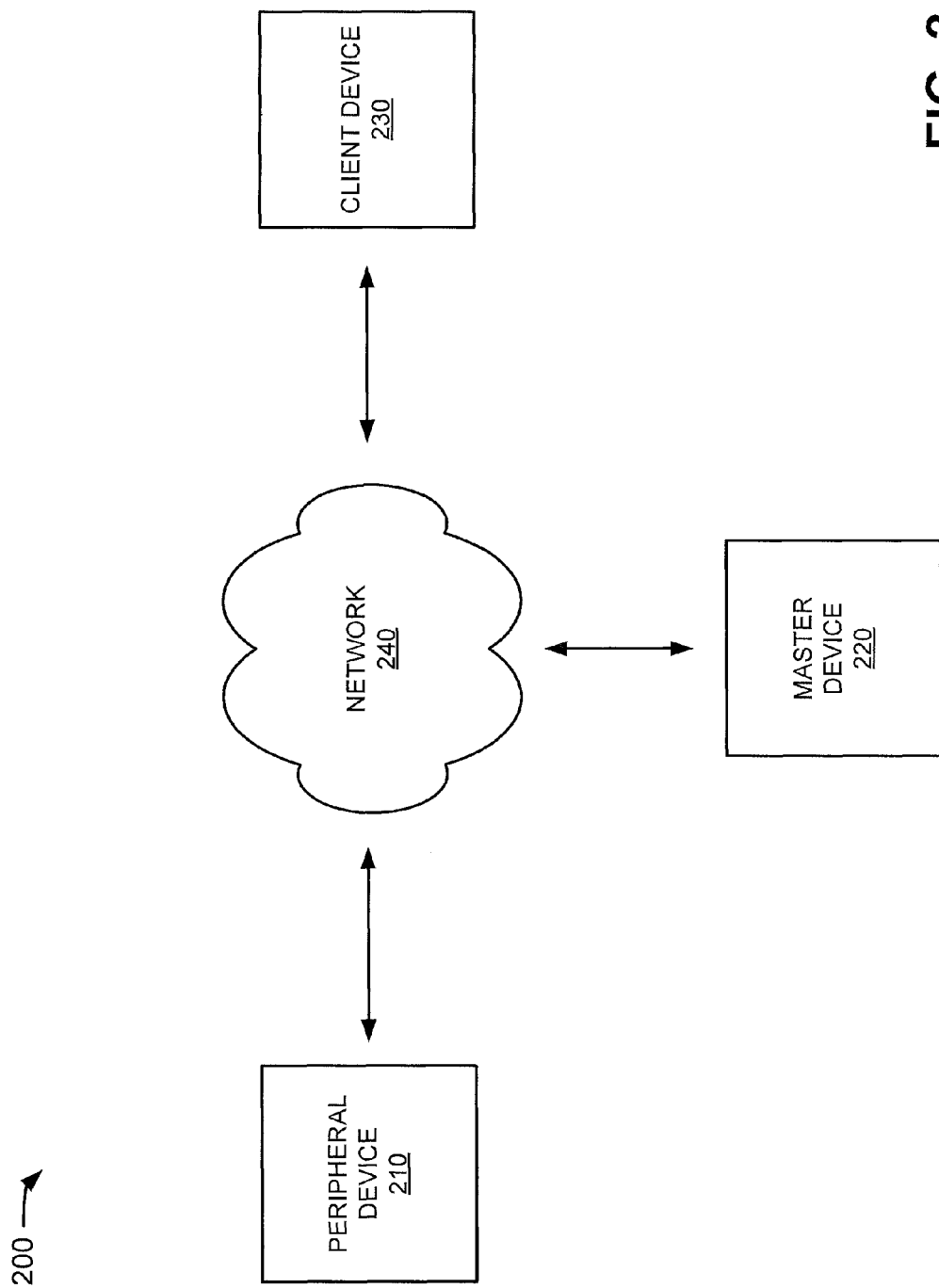

| DEVICE ID 410 | GRAMMAR 420 | DEVICE COMMAND 430 |
|---|---|---|
| FIREPLACE | FIREPLACE ON | TURN FIREPLACE ON |
| | FIREPLACE OFF | TURN FIREPLACE OFF |
| THERMOSTAT | HEATER UP | RAISE TEMPERATURE ON THERMOSTAT |
| | HEATER DOWN | LOWER TEMPERATURE ON THERMOSTAT |
| LIVING ROOM LIGHTS | LIVING ROOM ON | TURN LIVING ROOM LIGHTS ON |
| | LIVING ROOM OFF | TURN LIVING ROOM LIGHTS OFF |
| TELEVISION | TV ON | TURN TELEVISION ON |
| | TV OFF | TURN TELEVISION OFF |
| | MUTE | SET TELEVISION SOUND TO 0 |

FIG. 4

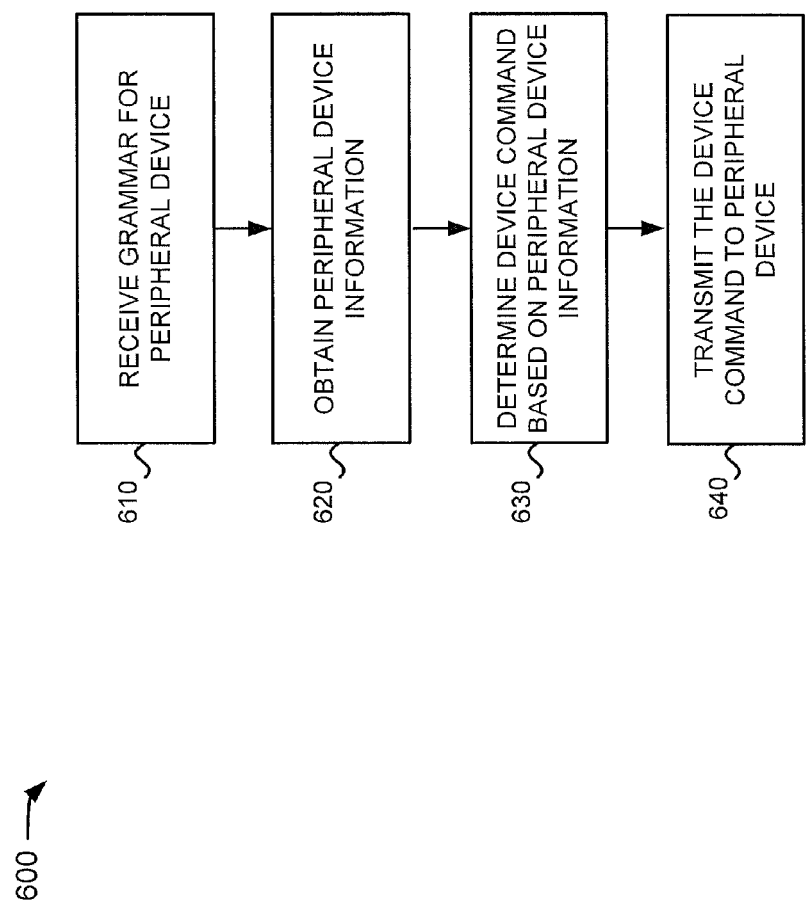

COMPARTMENTALIZED SELF REGISTRATION OF EXTERNAL DEVICES

BACKGROUND

A system may include multiple devices for performing various functions. The multiple devices may be controlled by a master device.

SUMMARY

According to some possible implementations, a method includes receiving, by one or more processors of a master device and from a peripheral device, information for controlling the peripheral device, the information for controlling the peripheral device including: information identifying a voice command associated with the peripheral device, and; information identifying a function corresponding to the voice command. The method further includes receiving, by the one or more processors and from a user, the voice command; and causing, by the one or more processors, the peripheral device to perform the function based on receiving the voice command.

According to some possible implementations, the master device controls a system and receiving the information includes receiving the information for controlling the peripheral device during a registration of the peripheral device with the system.

According to some possible implementations, the method further includes receiving, by the master device and from the peripheral device, information for providing a user interface. The method also includes providing, by the master device, the user interface; receiving, by the master device and via the user interface, configuration information for configuring the peripheral device; and causing, by the master device, the peripheral device to be configured based on the configuration information.

According to some implementations, receiving the information includes receiving the information for controlling the peripheral device in a generic format.

According to some possible implementations, receiving the information includes receiving a document that includes the information for controlling the peripheral device, the document including one of: an Extended Markup Language (XML) document, a JavaScript Object Notation (JSON) document, or a ProtocolBuffers document. The method also includes parsing the document to determine the voice command and the function.

According to some possible implementations, the master device is a client device and receiving the voice command includes receiving the voice command via a microphone of the client device.

According to some possible implementations, causing the peripheral device to perform the function includes sending, to the peripheral device and via a wireless network, an instruction to perform the function based on receiving the voice command.

According to some possible implementations, a device includes one or more processors. The one or more processors are to receive, from a peripheral device, information for controlling the peripheral device, the information for controlling the peripheral device including information identifying a voice command associated with the peripheral device, and information identifying a function associated with the voice command. The one or more processors are also to receive, from a user, the voice command. The one or more processors are further to determine, based on the information for controlling the peripheral device, that the function is associated with the voice command; and cause the peripheral device to perform the function based on the function being associated with the voice command.

According to some possible implementations, when receiving the information, the one or more processors are to receive the information for controlling the peripheral device during a registration of the peripheral device with the device.

According to some possible implementations, the one or more processors are further to receive, from the peripheral device, information for providing a user interface. The one or more processors are also to provide, based on the information for providing the user interface, the user interface for display. The one or more processors are further to receive, via the user interface, configuration information for configuring the peripheral device; and transmit, by the device, the configuration information to the peripheral device.

According to some possible implementations, when receiving the information, the one or more processors are to receive the information for controlling the peripheral device in a generic format.

According to some possible implementations, when receiving the information, the one or more processors are to receive a document that includes the information for controlling the peripheral device, the document including one of an Extended Markup Language (XML) document, a JavaScript Object Notation (JSON) document, or a ProtocolBuffers document. The one or more processors are further to parse the document, and determine the voice command and the function based on parsing the document.

According to some possible implementations, when receiving the voice command, the one or more processors are to receive the voice command via a microphone associated with the device.

According to some possible implementations, when causing the peripheral device to perform the function, the one or more processors are to send, to the peripheral device and via a wireless network, an instruction to perform the function based on receiving the voice command.

According to some possible implementations, a computer-readable medium stores instructions. The instructions include one or more instructions that, when executed by one or more processors, cause the one or more processors to receive, from a peripheral device, information for controlling the peripheral device, the information for controlling the peripheral device including information identifying a user command associated with a function performed by the peripheral device, and information identifying a device command for causing the peripheral device to perform the function. The one or more instructions further cause the one or more processors to receive, from a user, the user command. The one or more instructions further cause the one or more processors to determine, based on the information for controlling the peripheral device, the device command; and send, based on receiving the user command, the device command to the peripheral device to cause the peripheral device to perform the function.

According to some possible implementations, the master device controls a system. The one or more instructions to receive the information further cause the one or more processors to receive the information for controlling the peripheral device during a registration of the peripheral device with the system.

According to some possible implementations, the one or more instructions further cause the one or more processors to receive, from the peripheral device, information for providing a user interface. The one or more instructions also cause the one or more processors to provide the user interface for display. The one or more instructions further cause the one or more processors to receive, via the user interface, configuration information for configuration the peripheral device; and cause the peripheral device to be configured based on the configuration information.

According to some possible implementations, the one or more instructions further cause the one or more processors to receive the information for controlling the peripheral device in a generic format.

According to some possible implementations, the one or more instructions to receive the information further cause the one or more processors to receive a document that includes the information for controlling the peripheral device, the document including one of an Extended Markup Language (XML) document, a JavaScript Object Notation (JSON) document, or a ProtocolBuffers document. The one or more instructions further cause the one or more processors to parse the document to determine the user command and the device command.

According to some possible implementations, the one or more instructions to receive the user command further cause the one or more processors to receive the user command from a client device that is different from the master device.

According to some possible implementations, a system includes means for receiving, from a peripheral device, information for controlling the peripheral device, the information for controlling the peripheral device including information identifying a voice command associated with the peripheral device, and information identifying a function corresponding to the voice command. The system further includes means for receiving, from a user, the voice command; and means for causing the peripheral device to perform the function based on receiving the voice command.

The above discussion mentions examples in which some implementations may be implemented via one or more methods performed by one or more processors of one or more devices. In some implementations, one or more systems and/or one or more devices may be configured to perform one or more of the acts mentioned above. In some implementations, a computer-readable medium may include computer-executable instructions which, when executed by one or more processors, cause the one or more processors to perform one or more of the acts mentioned above.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 2 is a diagram of an example environment in which systems and/or methods described herein may be implemented;

FIG. 4 is a data structure for storing grammars and/or vocabularies used by devices in a system;

FIG. 6 is a flowchart of an example process for controlling a device within a system;

DETAILED DESCRIPTION

The following detailed description refers to the accompanying drawings. The same reference numbers in different drawings may identify the same or similar elements.

A system may include a master device and one or more peripheral devices that are controlled by the master device. When a peripheral device is added to the system, the peripheral device may send information for controlling the peripheral device (e.g., grammars, vocabularies, etc.) and/or a user interface for configuring the peripheral device to the master device. The information sent to the master device may be generic and not an actual program. The generic format may allow the master device to recognize new peripheral devices that are added to the system and may eliminate compatibility issues that may arise due to differences in software between the master device and the added peripheral devices. The master device may use the information for controlling the peripheral device and/or the user interface to control and/or configure the peripheral device.

Figure 1A:
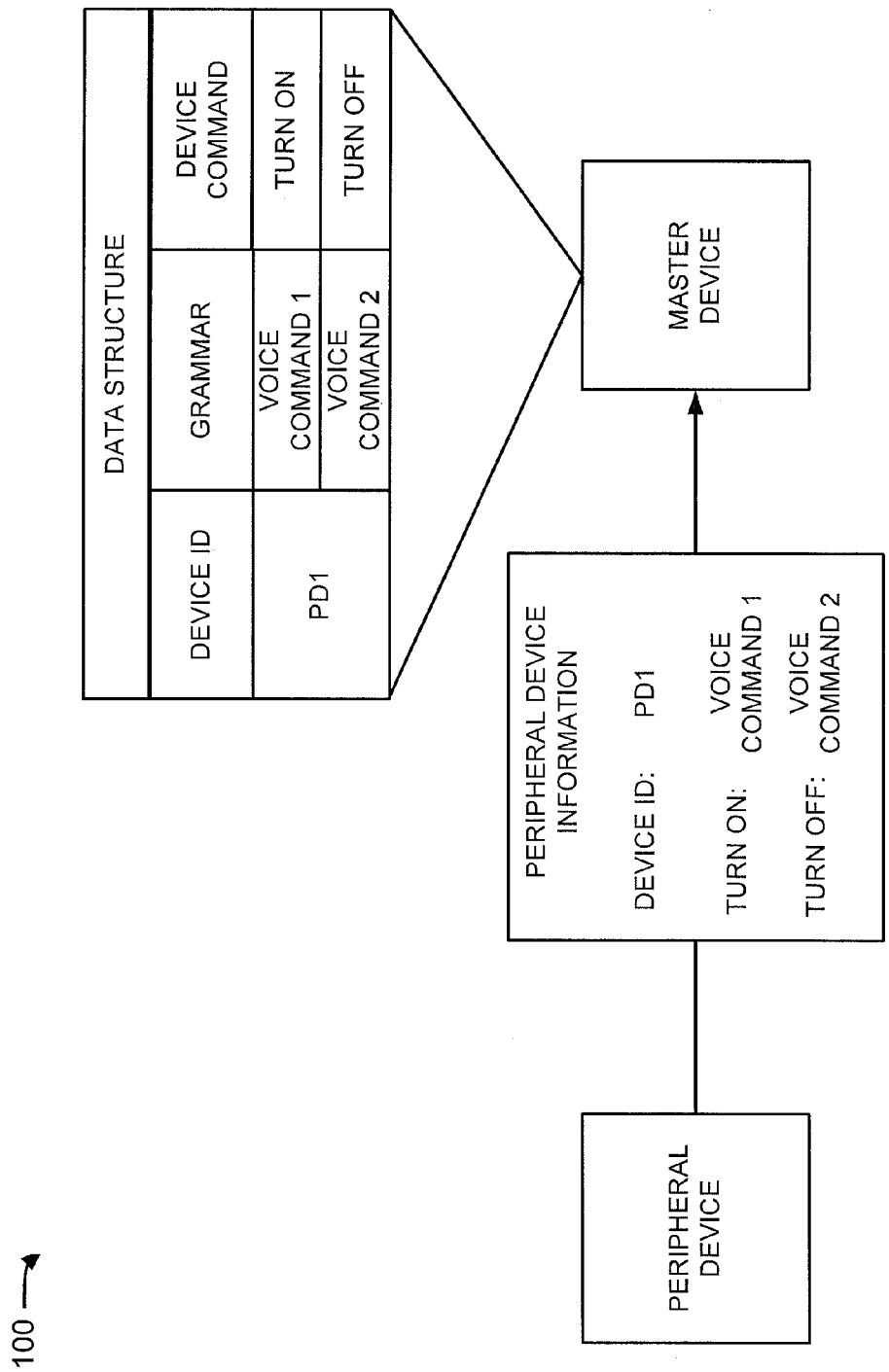
FIGS. 1A and 1B are diagrams illustrating an overview of an example implementation described herein.
Figure 1B:
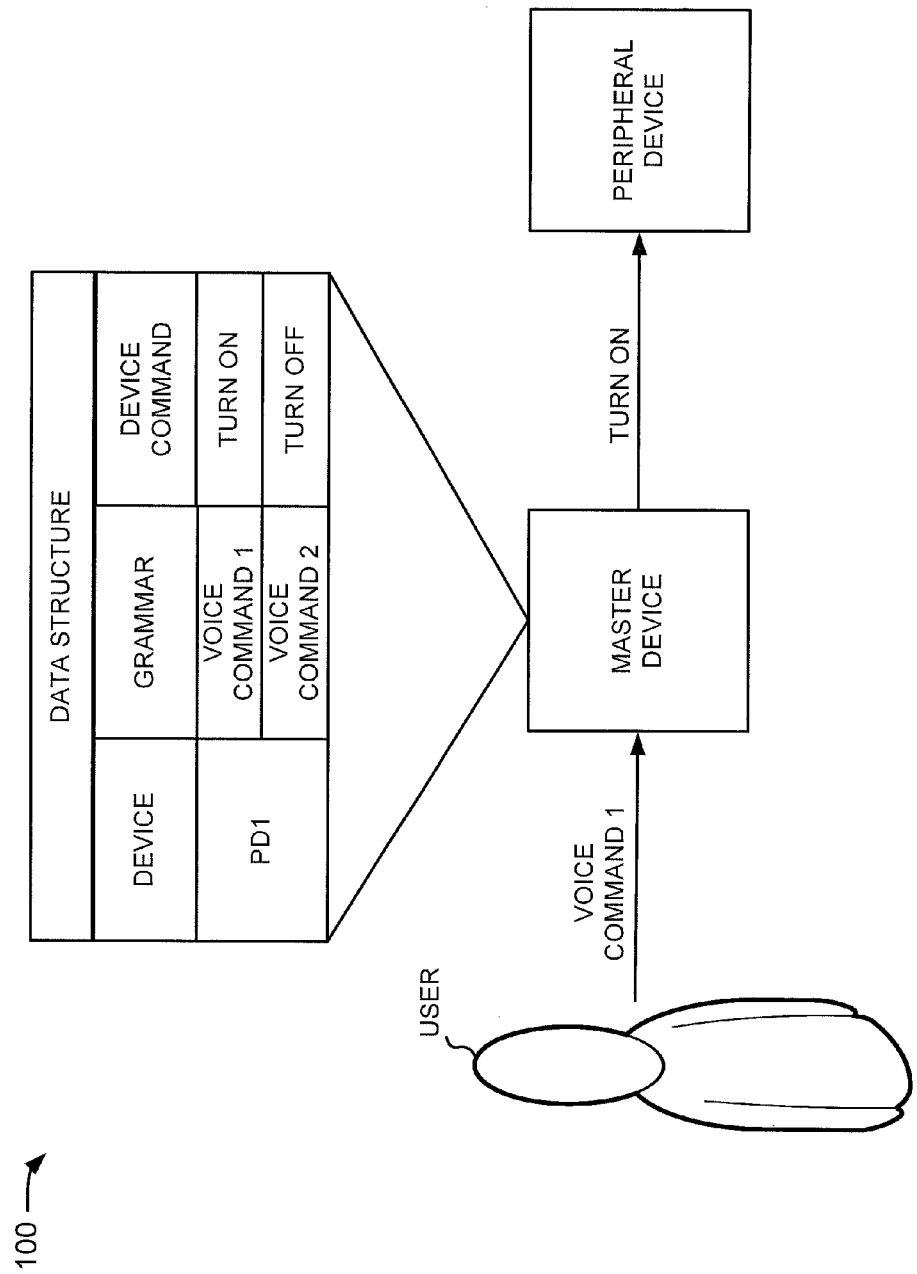

FIGS. 1A and 1B are diagrams illustrating an overview 100 of an example implementation described herein. With reference to FIG. 1A, assume a user adds a new peripheral device to a system that interconnects various devices of the user. Further, assume that the system is controlled by a master device and that the master device controls the operation of the peripheral device in response to voice commands that the master device receives from the user. Assume further, in response to the user connecting the peripheral device to the system, the peripheral device registers with the master device and that as part of registering with the system, the peripheral device sends the master device information for controlling the peripheral device (e.g., grammars).

As shown in FIG. 1A, the peripheral device sends a list of peripheral device commands to the master device. The master device may receive the list of peripheral device commands and may store the list in a data structure. The master device may use the data structure to translate voice commands received from the user into corresponding instruction for controlling the operation of the peripheral device. Referring now to FIG. 1B, assume that the user desires to turn the peripheral device on. As shown in FIG. 1B, the user may provide a voice command ("Command 1") to the master device to instruct the master device to turn the peripheral device on. The master device may receive the voice command and may access the data structure to determine a corresponding instruction for the peripheral device. As shown in FIG. 1B, the master device receives the voice command and determines that the voice command corresponds to the command "TURN ON." The master device sends the command to the peripheral device to cause the peripheral device to turn on.

FIG. 2 is a diagram of an example environment 200 in which systems and/or methods described herein may be implemented. Environment 200 may include a peripheral device 210, a master device 220, a client device 230, and a network 240.

Peripheral device 210 may include a device, or a collection of devices, that is capable of being controlled by master device 220 via a network, such as network 240. Peripheral device 210 may communicate peripheral device information to master device 220. The peripheral device information may enable master device 220 to configure and/or control peripheral device 210.

In some implementations, peripheral device 210 may not be able to receive an input from a user. Peripheral device 210 may send peripheral device information to master device 220. Master device 220 may receive the peripheral device information and may use the peripheral device information to receive the input from the user as a proxy for peripheral device 210.

In some implementations, peripheral device 210 may include a device that is connected to an automation system used to control devices in a home, office, boat, car, and/or another environment. Examples of peripheral device 210 may include an appliance or other type of device that may be found in a user's home or office, such as, for example, a television, a radio, an alarm system, a dishwasher, a washer machine, a vacuum cleaner, a light fixture, an electrical outlet, a heating unit, a cooling unit, an electronic lock (e.g., a lock on a door to a room, a cabinet, etc.), etc. that is configured to be controlled by master device 220. Other examples of peripheral device 210 may include a laptop, a tablet computer, a personal computer, and/or other types of devices that are capable of being controlled by master device 210.

Master device 220 may include a device, or a collection of devices, that is capable of controlling peripheral device 210 based on peripheral device information received from peripheral device 210 and transmitting instructions to peripheral device 210. Examples of master device 220 may include a laptop, a tablet computer, a personal computer, and/or similar types of devices.

Client device 230 may include a device, or a collection of devices, that is capable of receiving a command for controlling peripheral device 210 from a user and transmitting the received command to master device 220. Examples of client device 230 may include a laptop, a tablet computer, a personal computer, and/or similar types of devices.

Network 240 may include any type of network, such as, for example, a local area network ("LAN"), a wide area network ("WAN"), a telephone network, such as the Public Switched Telephone Network ("PSTN") or a cellular network, an intranet, the Internet, or a combination of these or other types of networks. In some implementations, network 240 may include a local wireless network, such as a home wireless network. Peripheral device 210, master device 220, and client device 230 may connect to network 240 via wired and/or wireless connections. In other words, any one of peripheral device 210, master device 220, and/or user device 230 may connect to network 240 via a wired connection, a wireless connection, or a combination of a wired connection and a wireless connection.

Although FIG. 2 shows example components of environment 200, in some implementations, environment 200 may include additional components, fewer components, different components, or differently arranged components than those depicted in FIG. 2. Additionally, or alternatively, one or more components of environment 200 may perform one or more tasks described as being performed by one or more other components of environment 200.

Figure 3:
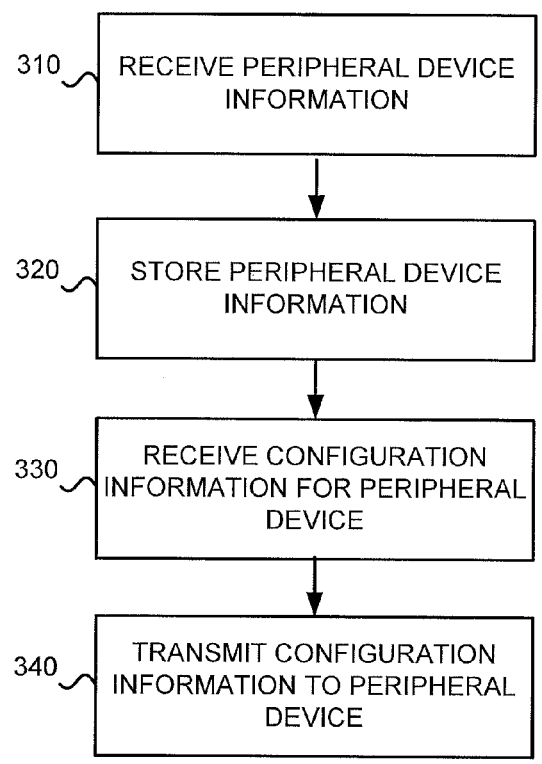
FIG. 3 is a flowchart of an example process for registering a device with a system.

FIG. 3 is a flowchart of an example process 300 for receiving peripheral information from a peripheral device. In some implementations, process 300 may be performed by master device 220. In some implementations, some or all of the blocks described below may be performed by a different device or group of devices, including or excluding master device 220.

Process 300 may include receiving peripheral device information (block 310). For example, master device 220 may receive peripheral device information from peripheral device 210. In some implementations, master device 220 may receive peripheral device information from peripheral device 210 when peripheral device 210 is connected to network 240. In some implementations, master device 220 may receive peripheral device information from peripheral device 210 at other times (e.g., during or after a registration process). In some implementations, the peripheral device information may include a text file. Master device 220 may receive the text file from peripheral device 210.

In some implementations, the peripheral device information may include information identifying peripheral device 210. For example, the peripheral device information may include information for identifying peripheral device 210 within a system and/or network. Examples of information identifying peripheral device 210 may include a device identifier (e.g., serial number, name, part number, manufacturer information, etc.), a network address, and/or other types of information that enables master device 210 to identify peripheral device 210.

In some implementations, the peripheral device information may include information identifying one or more grammars associated with peripheral device 210. Each grammar may define an input that can be provided to master device 220 by a user and/or client device 230 to cause master device 230 to instruct peripheral device 210 to perform a particular function. In some implementations, a grammar may define a voice command (e.g., a word, phrase, and/or sentence that may be spoken by a user to cause a peripheral device 210 to perform a particular function), a gesture (e.g., a physical gesture detected by a camera of master device 220 and/or client device 230), a keystroke (e.g., a selection of one or more keys on a keyboard of master device 220 and/or client device 230), and/or other type of input that may be provided by a user via master device 220 and/or client device 230.

In some implementations, the peripheral device information may include information that enables master device 230 to generate one or more device commands for instructing peripheral device 210 to perform one or more functions corresponding to the one or more grammars. For example, the peripheral device information may include syntax information, protocol information, message structure information, and/or other information that enables master device 220 to generate a signal (e.g., message) for instructing peripheral device 210 to perform a particular function.

In some implementations, the peripheral device information may include information identifying a relationship between the one or more grammars, the one or more device commands, and/or one or more functions that may be performed by peripheral device 210. For example, the peripheral device information may enable master device 220 to identify a device command that corresponds to each grammar identified in the peripheral device information.

In some implementations, the peripheral device information may include information for providing a user interface associated with peripheral device 210. For example, the peripheral device information may include information for providing a user interface for receiving configuration information for configuring peripheral device 210. The information for providing a user interface associated with peripheral device 210 may enable master device 220 to provide a user interface for receiving the configuration information from the user.

In some implementations, master device 220 may cause the user interface to be displayed via a display of master device 220 and/or user device 230. For example, master device 220 may receive a request to configure peripheral device 210 from client device 230. Master device 220 may send the information for providing the user interface to client device 230 in response to the request. Client device 230 may receive the information and may display a user interface for configuring peripheral device 210 based on the received information.

The information for providing the user interface may allow master device 220 to cause peripheral device 210 to be configured efficiently. For example, a manufacturer of peripheral device 210 may determine an efficient manner (a type of configuration to be provided to peripheral device 210, a format for receiving configuration information from a user, a format for providing the configuration information to peripheral device 210, an order for providing configuration information to peripheral device 210, etc.). The information for providing the user interface may enable master device 220 to provide a user interface for obtaining the configuration in the efficient manner.

In some implementations, the information for providing the user interface may be generic (e.g., not an application, not tied to a specific computing architecture, etc.). In some implementations, the information for providing the user interface may be in a generic format, such as, for example, an Extended Markup Language (XML) format, a JavaScript Object Notation (JSON) format, ProtocolBuffers format, a human readable format, a binary format, etc.

Process 300 may include storing the peripheral device information (block 320). For example, master device 220 may store the peripheral device information received from peripheral device 210. In some implementations, master device 220 may store the peripheral device information in a memory associated with master device 220. For example, master device 220 may generate a data structure that includes peripheral device information for one or more peripheral devices 210 connected to a system controlled by master device 220. Master device 220 may store the data structure in a memory of master device 220 and/or a memory of another device that is accessible to master device 220.

Process 300 may include receiving configuration information for peripheral device 210 (block 330). For example, master device 220 may receive configuration information for peripheral device 210 from a user. In some implementations, master device 220 may provide a user interface for receiving configuration information for peripheral device 210. For example, the peripheral device information may include information for providing a user interface for configuring peripheral device 210. Master device 220 may cause the user interface to be provided based on the information for providing the user interface.

In some implementations, master device 220 may cause the user interface to be displayed on a display of master device 220. Master device 220 may receive configuration information from a user via the displayed user interface. In some implementations, master device 220 may cause the user interface to be displayed via a display of client device 230. Client device 230 may display the user interface and may send configuration information received via the user interface to master device 220.

Process 300 may include transmitting configuration information to the peripheral device (block 340). For example, master device 220 may transmit the configuration information received from a user and/or client device 230 to peripheral device 210. Peripheral device 210 may receive the configuration information and may configure, adjust, set, and/or modify, one or more settings, functions, operations, characteristics, etc. based on the configuration information.

While FIG. 3 shows process 300 as including a particular quantity and arrangement of blocks, in some implementations, process 300 may include fewer blocks, additional blocks, or a different arrangement of blocks. Additionally, or alternatively, some of the blocks may be performed in parallel.

FIG. 4 is a diagram of an example data structure 400 that may store peripheral device information for controlling peripheral devices. In some implementations, data structure 400 may be stored by master device 220. In some implementations, data structure 400 may be stored by a another device that is accessible by master device 220. In some implementations, data structure 400 may be created based on the processing described in connection with FIG. 3.

As shown in FIG. 4, data structure 400 may include a device identifier (ID) field 410, a grammar field 420, and a command field 430. In some implementations, data structure 400 may be associated with a particular peripheral device 210. For example, master device 220 may store a separate data structure 400 for each peripheral device 210 controlled by master device 220.

Device ID field 410 may store a device identifier and/or other information identifying a peripheral device. The device identifier and/or other information identifying a peripheral device may include a unique sequence of characters, a network address, and/or other information that can be used to uniquely identify peripheral device 210 within a system.

Grammar field 420 may store information identifying one or more grammars included in peripheral device information received by master device 220. The one or more grammars may be text, a voice sample (e.g., that may be unique to a particular user so only the user could cause peripheral device 210 to perform a function), a detected gesture, etc.

Device command field 430 may store information that identifies a command for causing the peripheral device to perform a function associated with the grammar identified in grammar field 420. The command may be a data packet, a message, an infra-red (IR) command, etc. that can be retrieved by master device 220. Device command field 430 may store information for retrieving the command from a memory, information for generating the command, and/or information for sending the command to peripheral device 210.

Although FIG. 4 shows example fields of data structure 400, in some implementations, data structure 400 may include additional fields, different fields, or fewer fields than those depicted in FIG. 4.

FIGS. 5A-5D are an example 500 of the process described above with respect to FIG. 3. For example 500, assume that a user adds a new peripheral device to a home automation system controlled by master device 220. Further, assume that the new peripheral device is a thermostat for controlling a temperature of a bedroom of the user's house and that the thermostat can be configured to set the bedroom at different temperatures at different times and/or days of the week. Further, assume that the thermostat can be controlled using voice commands and that after being connected to the home automation system, master device 220 receives peripheral device information from the thermostat as part of registering with the home automation system.

Figure 5A:
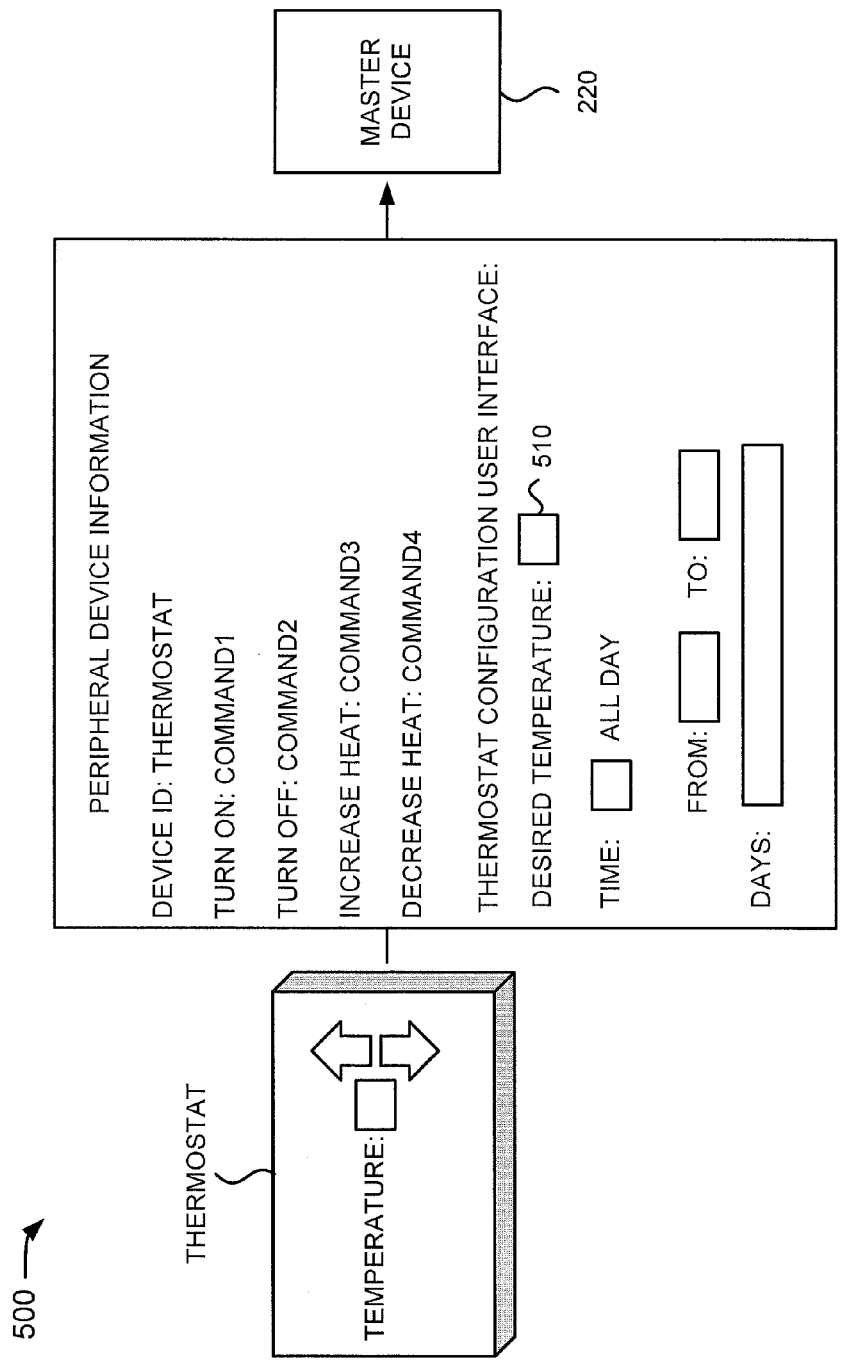
FIGS. 5A-5D are an example of the process described with respect to FIG. 4.

Referring to FIG. 5A, the peripheral device information may include information identifying grammars, information identifying device commands corresponding to the grammars, and information for providing a user interface for receiving configuration information for the thermostat. As shown in FIG. 5A, the peripheral device information identifying the device ID of the thermostat as "THERMOSTAT," identifies "COMMAND1" as the device command corresponding to the grammar "TURN ON," "COMMAND2" as the device command corresponding to the grammar "TURN OFF," "COMMAND3" as the device command corresponding to the grammar "INCREASE HEAT," and "COMMAND4" as the device command corresponding to the grammar "DECREASE HEAT." Master device 220 may receive the peripheral device information and may store the peripheral device information in a memory of master device 220.

Figure 5B:
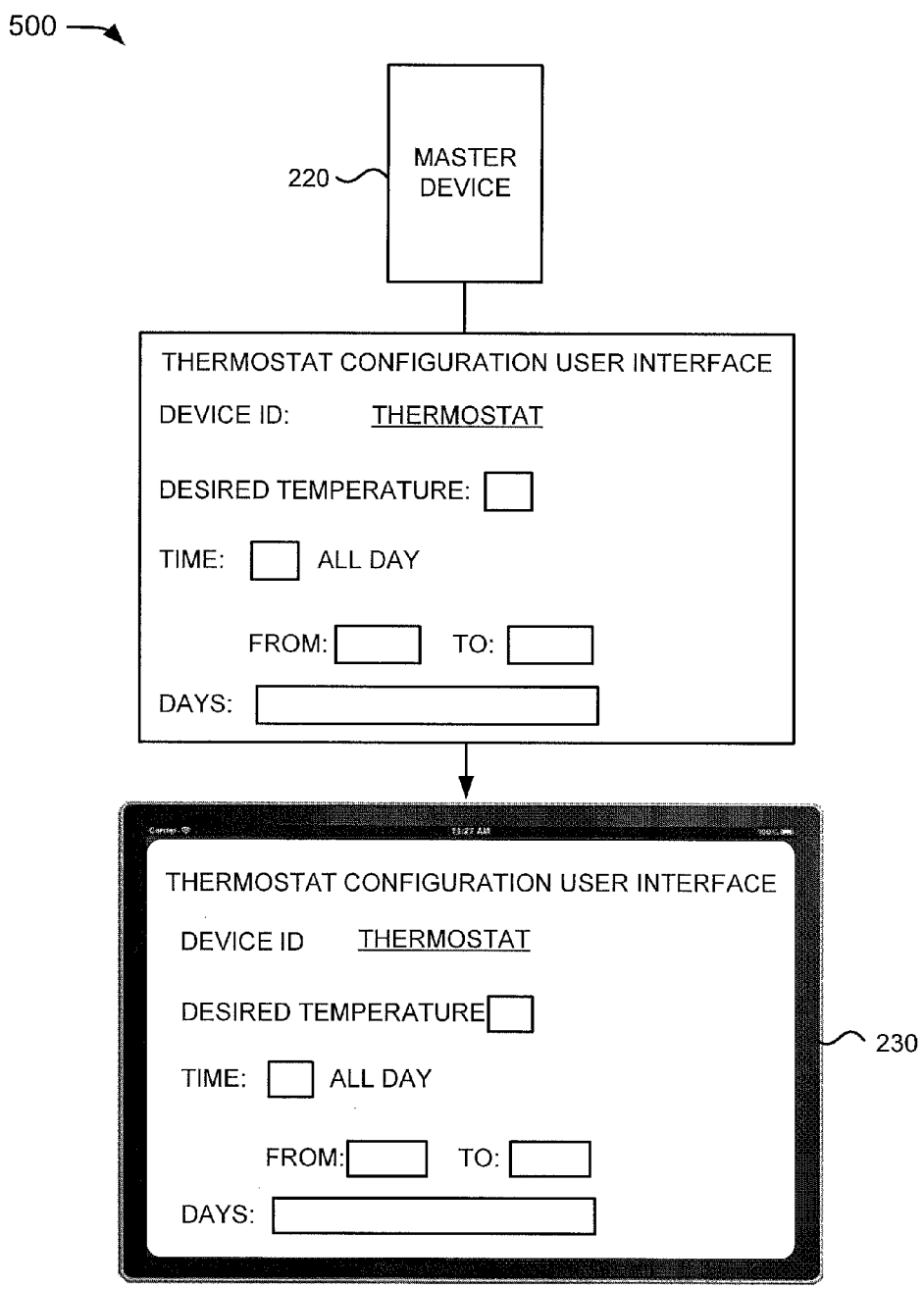

Referring now to FIG. 5B, assume that client device 230 (shown as a table computer) is connected to master device 220 via a network associated with the home automation system and that master device 220 determines that the user desires to configure the thermostat using client device 230. Master device 220 may send the information for providing the user interface to client device 230. Client device 230 may receive the information for providing the user interface and may, based on the received information, display a user interface that allows the user to configure the thermostat. As shown in FIG. 5B, the user interface includes a field to change the device ID for the thermostat and multiple fields for receiving information identifying a temperature and times at which the bedroom is to be set at the identified temperature.

Figure 5C:
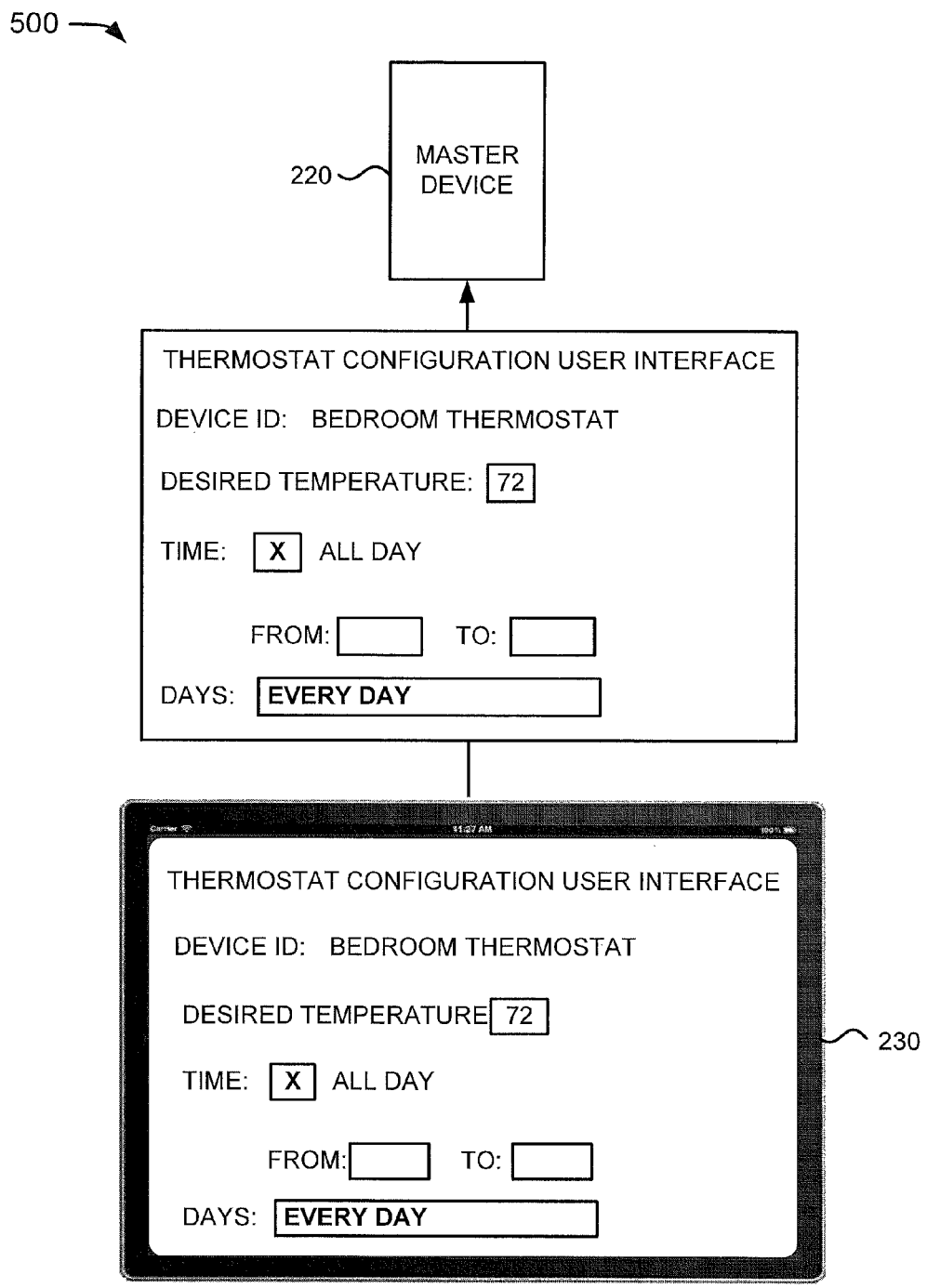

Referring now to FIG. 5C, assume that the user enters a new device ID for the thermostat, a desired temperature, and information identifying times at which the bedroom is to be set at the desired temperatures into fields of the user interface. As shown in FIG. 5C, the user enters a new device ID "BEDROOM THERMOSTAT" for the thermostat and provides information indicating that the thermostat should set the room to be at 72 degrees each day for the entire day. Client device 230 may receive the configuration information entered by the user and may send the configuration information to master device 220.

Figure 5D:
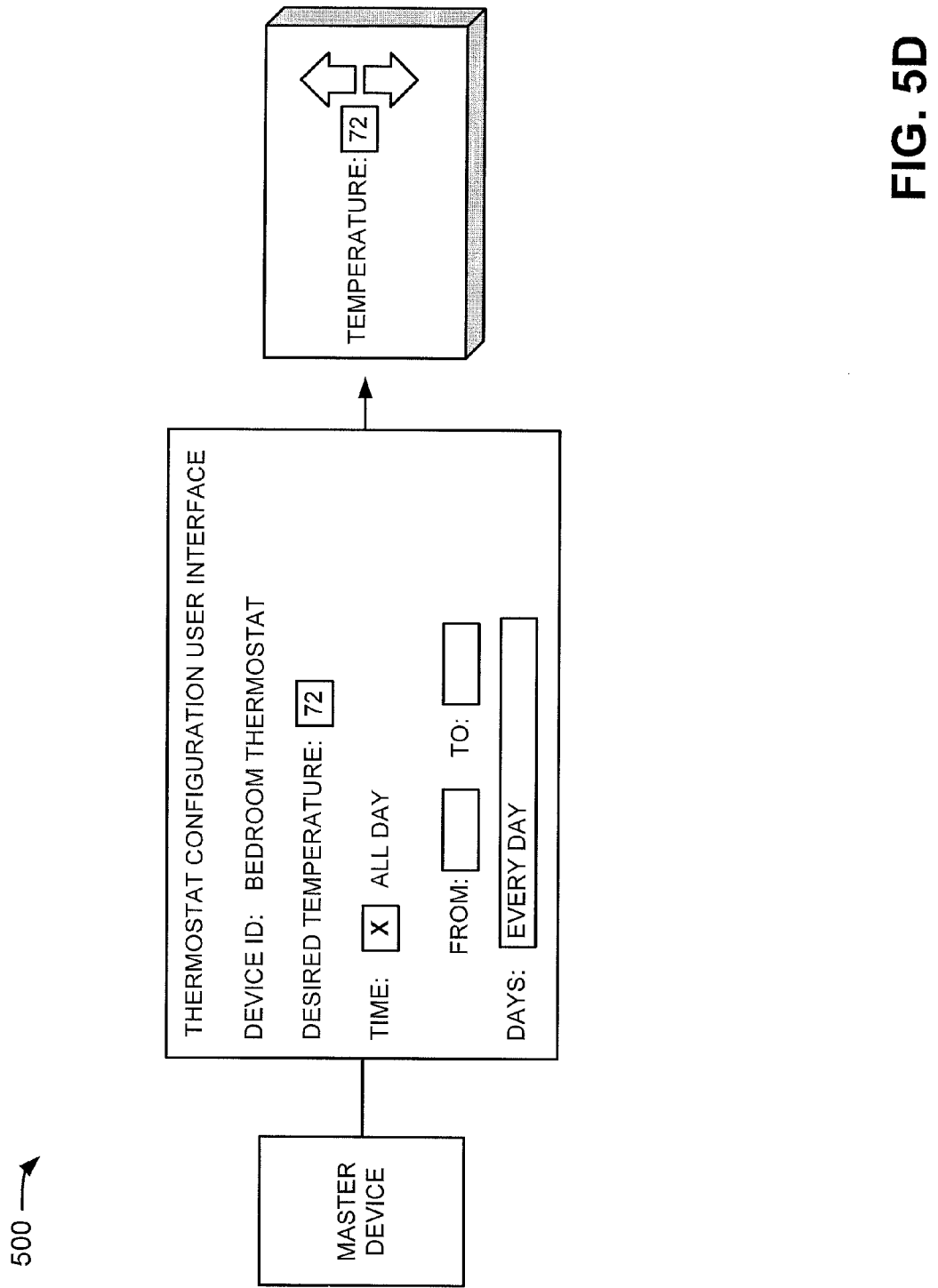

Referring to FIG. 5D, master device 220 may receive the configuration information from client device 230. Master device 220 may modify the peripheral device information received from the thermostat to indicate the new device ID for the thermostat and may send the configuration information to the thermostat. The thermostat may receive the configuration information from master device 220. Based on the configuration information, the thermostat may modify one or more settings to indicate the new device ID and may set the room to be at 72 degrees each day for the entire day.

FIG. 6 is a flowchart of an example process 600 for controlling a peripheral device using peripheral device information provided by the peripheral device. While FIG. 6 shows process 600 as including a particular sequence of blocks being performed by master device 220, in some implementations, some of the blocks of process 600 may be performed by a different device or group of devices, including or excluding master device 220.

Process 600 may include receiving a grammar for a peripheral device (block 610). For example, master device 220 may receive a grammar for peripheral device 210. In some implementations, master device 220 may receive the grammar from a user. For example, master device 220 may include a microphone for capturing voice commands from users registered with master device 220. Master device 220 may receive a voice command from a user via the microphone. In some implementations, master device 220 may receive the grammar from client device 230. For example, a user may provide a command (e.g., a voice command, a keystroke, a gesture on a display, etc.) to client device 230. Client device 230 may receive the command and may provide the command to master device 220.

Process 600 may include obtaining peripheral device information (block 620). For example, master device 220 may obtain peripheral device information based on receiving the grammar. In some implementations, peripheral device information may be stored in a data structure stored in a memory. Master device 220 may access the memory to retrieve the data structure based on receiving the grammar. In some implementations, master device 220 may identify a peripheral device associated with the voice command and may obtain the peripheral device information based on identifying the peripheral device. As an example, assume that master device 220 receives a voice command, "Light On," from a user. Master device 220 may determine that the first portion of the voice command "Light" is an identifier associated with peripheral device 210. Master device 220 may obtain peripheral device information for peripheral device 210.

Process 600 may include determining a device command based on the peripheral device information (block 630). For example, master device 220 may determine a peripheral device command that corresponds to a received grammar based on the peripheral device information. In some implementations, the peripheral device information may include a list of entries. Each entry may identify a grammar that is associated with a particular function that may be performed by peripheral device 210 and a device command for instructing peripheral device 210 to perform the particular function. Master device 220 may identify an entry corresponding to a received grammar and may determine a device command identified in the entry.

In some implementations, the peripheral device information may include information identifying a user associated with the grammar and/or device command. Master device 220 may determine the device command based on an identity of a user providing the grammar. For example, a grammar may be associated with information identifying authorized users. Master device 220 may determine whether a user providing the grammar is an authorized user. If the user is an authorized user, master device 220 may determine the device command based on the peripheral information. If the user is not an authorized user, master device 220 may not determine the device command and/or may output a error message or other information indicating that the user is not an authorized user.

In some implementations, the grammar may include a voice command and the information identifying the authorized users may include voice data associated with an authorized user. Master device 220 may compare the voice command to the stored voice data and determine whether a user providing the grammar is an authorized user based on the comparison.

Process 600 may include may include transmitting the device command to the peripheral device. For example, master device 220 may transmit the device command to peripheral device 210 to cause peripheral device 210 to perform a function associated with a received user command.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel.

Figure 7:
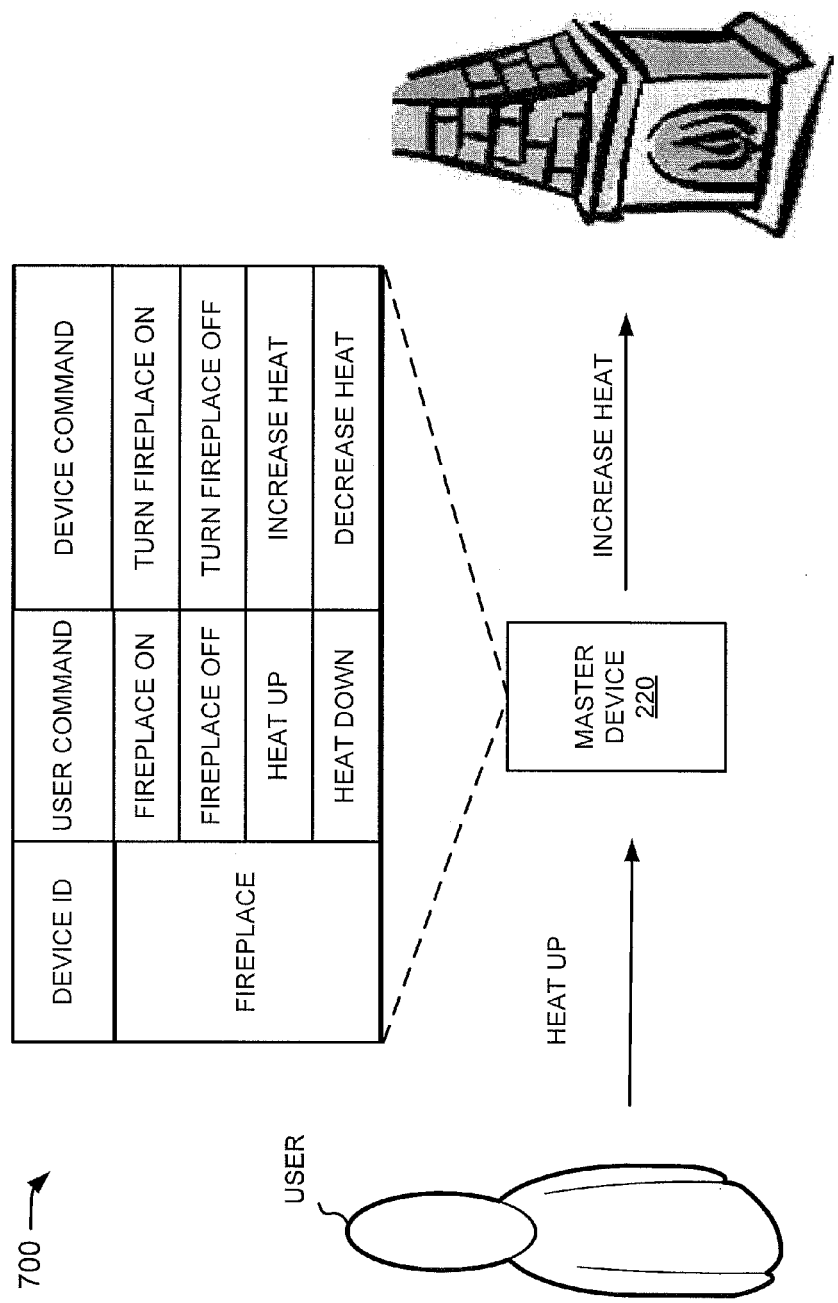
FIG. 7 is an example of the process described with respect to FIG. 6.

FIG. 7 is an example 700 of the process described above with respect to FIG. 6. With respect to FIG. 7, assume that a user desires to increase the amount of heat being provided by a fireplace. Further, assume that the fireplace provided peripheral device information to master device 220 to enable master device 220 to control the operation of the fireplace based on voice commands received from the user. The user may provide the voice command "HEAT UP" to master device 220. Master device 220 may receive the voice command and may access a data structure to determine a peripheral device and a device command associated with the voice command. Based on the data structure, master device 220 may determine that the voice command is associated with the peripheral device "FIREPLACE" and the device command "INCREASE HEAT." Master device 220 may send the device command to the peripheral device in response to the voice command received from the user. The peripheral device may receive the device command and may cause an amount of heat being output by the peripheral device to be increased in response to the device command.

Figure 8:
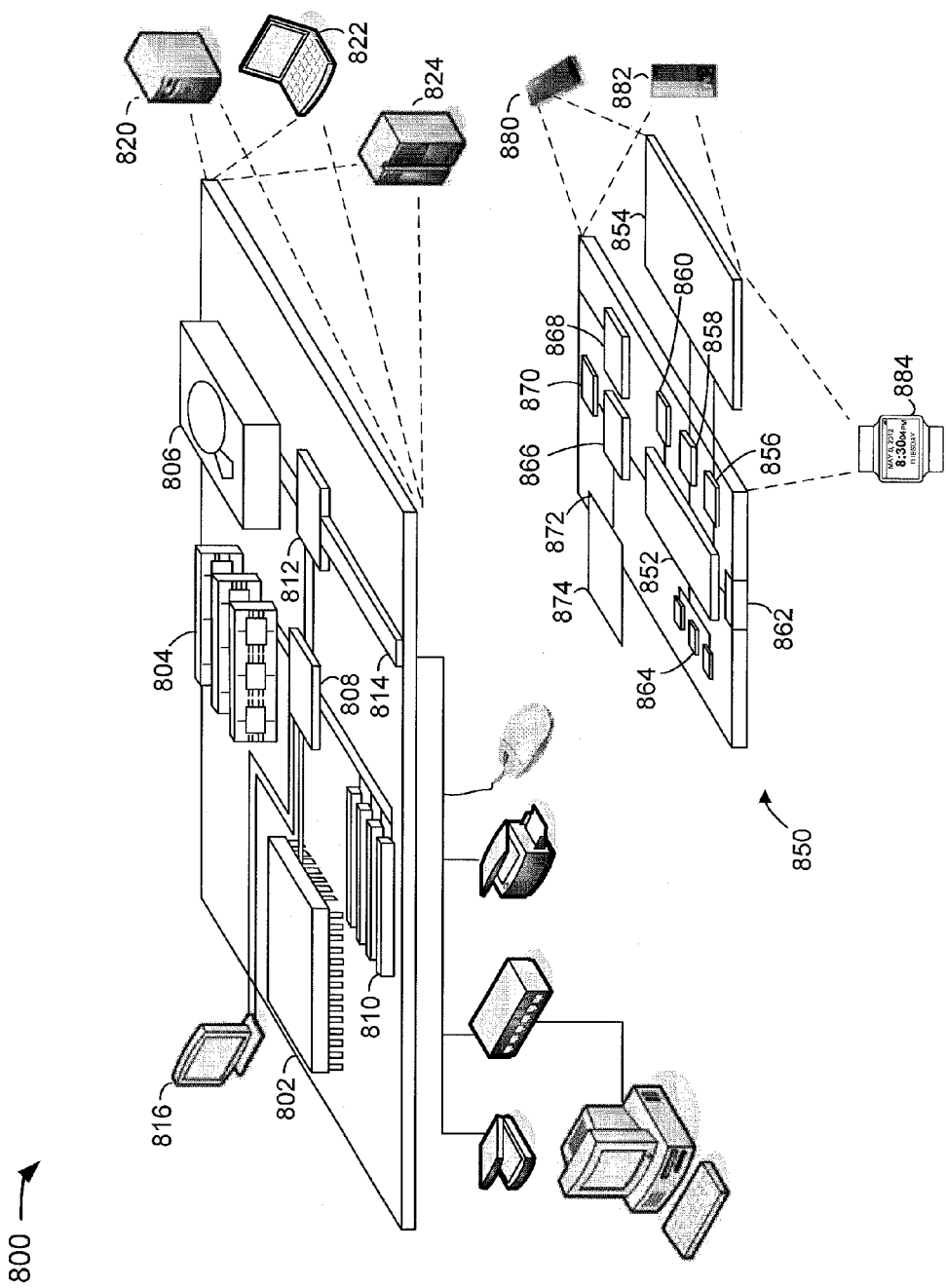
FIG. 8 is a diagram of an example of a generic computer device and a generic mobile computer device.

FIG. 8 is a diagram of an example of a generic computer device 800 and a generic mobile computer device 850, which may be used with the techniques described herein. Generic computer device 800 or generic mobile computer device 850 may correspond to, for example, a peripheral device 210, master device 220, and/or client device 230. Computer device 800 is intended to represent various forms of digital computers, such as laptops, desktops, workstations, personal digital assistants, servers, blade servers, mainframes, and other appropriate computers. Mobile computer device 850 is intended to represent various forms of mobile devices, such as personal digital assistants, cellular telephones, smart phones, and other similar computer devices. The components shown in FIG. 8, their connections and relationships, and their functions, are meant to be examples only, and are not meant to limit implementations described herein.

Computer device 800 may include a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. Processor 802 can process instructions for execution within the computer device 800, including instructions stored in the memory 804 or on the storage device 806 to display graphical information for a graphical user interface (GUI) on an external input/output device, such as display 816 coupled to high speed interface 808. In other implementations, multiple processors and/or multiple buses may be used, as appropriate, along with multiple memories and types of memory. Also, multiple computer devices 700 may be connected, with each device providing portions of the necessary operations, as a server bank, a group of blade servers, or a multi-processor system, etc.

Memory 804 stores information within the computer device 800. In some implementations, memory 804 includes a volatile memory unit or units. In some implementations, memory 804 includes a non-volatile memory unit or units. The memory 804 may also be another form of computer-readable medium, such as a magnetic or optical disk. A computer-readable medium may refer to a non-transitory memory device. A memory device may refer to storage space within a single storage device or spread across multiple storage devices.

The storage device 806 is capable of providing mass storage for the computer device 800. In some implementations, storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 804, storage device 806, or memory on processor 802.

High speed controller 808 manages bandwidth-intensive operations for the computer device 800, while low speed controller 812 manages lower bandwidth-intensive operations. Such allocation of functions is exemplary only. In one implementation, high-speed controller 808 is coupled to memory 804, display 816 (e.g., through a graphics processor or accelerator), and to high-speed expansion ports 810, which may accept various expansion cards (not shown). In this implementation, low-speed controller 812 is coupled to storage device 806 and low-speed expansion port 814. The low-speed expansion port, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

Computer device 800 may be implemented in a number of different forms, as shown in the figure. For example, computer device 800 may be implemented as a standard server 820, or multiple times in a group of such servers. Computer device 800 may also be implemented as part of a rack server system 824. In addition, computer device 800 may be implemented in a personal computer, such as a laptop computer 822. Alternatively, components from computer device 800 may be combined with other components in a mobile device (not shown), such as mobile computer device 850. Each of such devices may contain one or more of computer devices 800, 850, and an entire system may be made up of multiple computer devices 800, 850 communicating with each other.

Mobile computer device 850 may include a processor 852, memory 864, an input/output ("I/O") device, such as a display 854, a communication interface 866, and a transceiver 868, among other components. Mobile computer device 850 may also be provided with a storage device, such as a micro-drive or other device, to provide additional storage. Each of the components 850, 852, 864, 854, 866, and 868 are interconnected using various buses, and several of the components may be mounted on a common motherboard or in other manners as appropriate.

Processor 852 can execute instructions within mobile computer device 850, including instructions stored in memory 864. Processor 852 may be implemented as a chipset of chips that include separate and multiple analog and digital processors. Processor 852 may provide, for example, for coordination of the other components of mobile computer device 850, such as control of user interfaces, applications run by mobile computer device 850, and wireless communication by mobile computer device 850.

Processor 852 may communicate with a user through control interface 858 and display interface 856 coupled to a display 854. Display 854 may be, for example, a TFT LCD (Thin-Film-Transistor Liquid Crystal Display) or an OLED (Organic Light Emitting Diode) display, or other appropriate display technology. Display interface 856 may comprise appropriate circuitry for driving display 854 to present graphical and other information to a user. Control interface 858 may receive commands from a user and convert them for submission to the processor 852. In addition, an external interface 862 may be provide in communication with processor 852, so as to enable near area communication of mobile computer device 850 with other devices. External interface 862 may provide, for example, for wired communication in some implementations, or for wireless communication in other implementations, and multiple interfaces may also be used.

Memory 864 stores information within mobile computer device 850. Memory 864 can be implemented as one or more of a computer-readable medium or media, a volatile memory unit or units, or a non-volatile memory unit or units. Expansion memory 874 may also be provided and connected to mobile computer device 850 through expansion interface 872, which may include, for example, a SIMM (Single In Line Memory Component) card interface. Such expansion memory 874 may provide extra storage space for device 850, or may also store applications or other information for mobile computer device 850. Specifically, expansion memory 874 may include instructions to carry out or supplement the processes described above, and may include secure information also. Thus, for example, expansion memory 874 may be provide as a security component for mobile computer device 850, and may be programmed with instructions that permit secure use of device 850. In addition, secure applications may be provided via the SIMM cards, along with additional information, such as placing identifying information on the SIMM card in a non-hackable manner.

Expansion memory 874 may include, for example, flash memory and/or NVRAM memory. In some implementations, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Mobile computer device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, Wi-Fi, or other such transceiver (not shown). In addition, GPS (Global Positioning System) receiver component 870 may provide additional navigation- and location-related wireless data to mobile computer device 850, which may be used as appropriate by applications running on mobile computer device 850.

Mobile computer device 850 may also communicate audibly using audio codec 860, which may receive spoken information from a user and convert it to usable digital information. Audio codec 860 may likewise generate audible sound for a user, such as through a speaker, e.g., in a handset of mobile computer device 850. Such sound may include sound from voice telephone calls, may include recorded sound (e.g., voice messages, music files, etc.) and may also include sound generated by applications operating on mobile computer device 850.

Mobile computer device 850 may be implemented in a number of different forms, as shown in the figure. For example, mobile computer device 850 may be implemented as a cellular telephone 880. Mobile computer device 850 may also be implemented as part of a smart phone 882, personal digital assistant, a watch 884, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device (e.g., magnetic discs, optical disks, memory, Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The foregoing description provides illustration and description, but is not intended to be exhaustive or to limit the implementations to the precise form disclosed. Modifications and variations are possible in light of the above disclosure or may be acquired from practice of the implementations.

As used herein, the term component is intended to be broadly interpreted to refer to hardware or a combination of hardware and software, such as software executed by a processor.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by one or more processors of a master device and from a peripheral device, information for controlling the peripheral device,
      the information for controlling the peripheral device including:
         information identifying a voice command associated with the peripheral device, and
         information identifying a function corresponding to the voice command;
   receiving, by the one or more processors and from a user, the voice command;
   identifying, by the one or more processors, the peripheral device based on a portion of the voice command;
   obtaining, by the one or more processors, the information for controlling the peripheral device based on identifying the peripheral device; and
   causing, by the one or more processors, the peripheral device to perform the function based on receiving the voice command and the obtained information for controlling the peripheral device.

2. The method of claim 1, where the master device controls a system, and
   where receiving the information includes:
      receiving the information for controlling the peripheral device during a registration of the peripheral device with the system.

3. The method of claim 1, further comprising:
   receiving, by the master device and from the peripheral device, information for providing a user interface;
   providing, by the master device, the user interface;
   receiving, by the master device and via the user interface, configuration information for configuring the peripheral device; and
   causing, by the master device, the peripheral device to be configured based on the configuration information.

4. The method of claim 1, where receiving the information includes:
   receiving the information for controlling the peripheral device in a generic format.

5. The method of claim 1, where receiving the information includes:
   receiving, from the peripheral device, a document that includes the information for controlling the peripheral device,
      the document including one of:
         an Extended Markup Language (XML) document,
         a JavaScript Object Notation (JSON) document, or
         a ProtocolBuffers document; and
   where the method further comprises:
      parsing the document to determine the voice command and the function.

6. The method of claim 1, where the master device comprises a client device; and
   where receiving the voice command includes:
      receiving the voice command via a microphone of the client device.

7. The method of claim 1, where causing the peripheral device to perform the function includes:
   sending, to the peripheral device and via a wireless network, an instruction to perform the function based on receiving the voice command.

8. A device comprising:
   one or more processors to:
      receive, from a peripheral device, information for controlling the peripheral device,
         the information for controlling the peripheral device being generated at the peripheral device,
         the information for controlling the peripheral device including:
            information identifying a voice command associated with the peripheral device, and
            information identifying a function associated with the voice command;
      receive, from a user, the voice command;
      determine, based on the information for controlling the peripheral device, that the function is associated with the voice command; and
      cause the peripheral device to perform the function based on the function being associated with the voice command.

9. The device of claim 8, where, when receiving the information, the one or more processors are to:
   receive the information for controlling the peripheral device during a registration of the peripheral device with the device.

10. The device of claim 8, where the one or more processors are further to:
   receive, from the peripheral device, information for providing a user interface;
   provide, based on the information for providing the user interface, the user interface for display;
   receive, via the user interface, configuration information for configuring the peripheral device; and
   transmit, by the device, the configuration information to the peripheral device.

11. The device of claim 8, where, when receiving the information, the one or more processors are to:
   receive the information for controlling the peripheral device in a generic format.

12. The device of claim 8, where, when receiving the information, the one or more processors are to:
   receive a document that includes the information for controlling the peripheral device,
      the document including one of:
         an Extended Markup Language (XML) document,
         a JavaScript Object Notation (JSON) document, or
         a ProtocolBuffers document; and
   where the one or more processors are further to:
      parse the document, and
      determine the voice command and the function based on parsing the document.

13. The device of claim 8, where, when receiving the voice command, the one or more processors are to:
receive the voice command via a microphone associated with the device.

14. The device of claim 8, where, when causing the peripheral device to perform the function, the one or more processors are to:
send, to the peripheral device and via a wireless network, an instruction to perform the function based on receiving the voice command.

15. A non-transitory computer-readable medium storing instructions, the instructions comprising:
one or more instructions that, when executed by one or more processors of a master device, cause the one or more processors to:
receive, from a peripheral device, information for controlling the peripheral device,
the information for controlling the peripheral device including:
information identifying a user command associated with a function performed by the peripheral device, and
information identifying a device command for causing the peripheral device to perform the function;
receive, from a user, the user command;
identify the peripheral device based on a portion of the user command;
obtain the information for controlling the peripheral device based on identifying the peripheral device;
determine, based on the information for controlling the peripheral device, the device command; and
send, based on receiving the user command, the device command to the peripheral device to cause the peripheral device to perform the function.

16. The non-transitory computer-readable medium of claim 15, where the master device controls a system, and
where the one or more instructions to receive the information include:
one or more instructions that, when executed by the one or more processors, cause the one or more processors to receive the information for controlling the peripheral device during a registration of the peripheral device with the system.

17. The non-transitory computer-readable medium of claim 15, where the instructions further comprise:
one or more instructions that, when executed by the one or more processors, cause the one or more processors to:
receive, from the peripheral device, information for providing a user interface;
provide the user interface for display based on the information for providing the user interface;
receive, via the user interface, configuration information for configuring the peripheral device; and
cause the peripheral device to be configured based on the configuration information.

18. The non-transitory computer-readable medium of claim 15, where the one or more instructions to receive the information include:
one or more instructions that, when executed by the one or more processors, cause the one or more processors to receive the information for controlling the peripheral device in a generic format.

19. The non-transitory computer-readable medium of claim 15, where the one or more instructions to receive the information include:
one or more instructions that, when executed by the one or more processors, cause the one or more processors to receive a document that includes the information for controlling the peripheral device,
the document including one of:
an Extended Markup Language (XML) document,
a JavaScript Object Notation (JSON) document, or
a ProtocolBuffers document; and
where the instructions further comprise:
one or more instructions that, when executed by the one or more processors, cause the one or more processors to parse the document to determine the user command and the device command.

20. The non-transitory computer-readable medium of claim 15, where the one or more instructions to receive the user command include:
one or more instructions that, when executed by the one or more processors, cause the one or more processors to receive the user command from a client device that is different from the master device.

* * * * *